Fig-2

INVENTOR.
James E. Ballmer
Albert M. Rockwood
BY Gray, Mase & Dunson
ATTORNEYS.

United States Patent Office 2,829,533
Patented Apr. 8, 1958

2,829,533

AUTOMATIC TRANSMISSION CONTROL SYSTEM

James E. Ballmer, Canal Winchester, and Albert Miller Rockwood, Columbus, Ohio, assignors, by mesne assignments, to The Battelle Development Corporation, Columbus, Ohio, a corporation of Delaware Application March 5, 1956, Serial No. 569,573

15 Claims. (Cl. 74—472)

This invention relates to automatic-transmission control systems. It has to do more particularly with an automatic control system for a continuously variable transmission, especially in a vehicle, that causes the transmission to provide under a wide variety of conditions the drive ratio between the prime mover and the load that is optimum for economy and smooth operation, and that permits the operator to control the transmission, except under certain conditions where it has been determined that full automatic control is preferable.

Among the features of this invention are: economical operation because of optimum designer-controlled engine loading; smooth performance because of substantially infinite drive ratios available with stepless shifting; availability to the operator of any desired amount of engine braking within the speed limits of the engine; high overall efficiency and design flexibility because the engine designer can predetermine the engine operating curve and design the engine accordingly.

Figure 1:
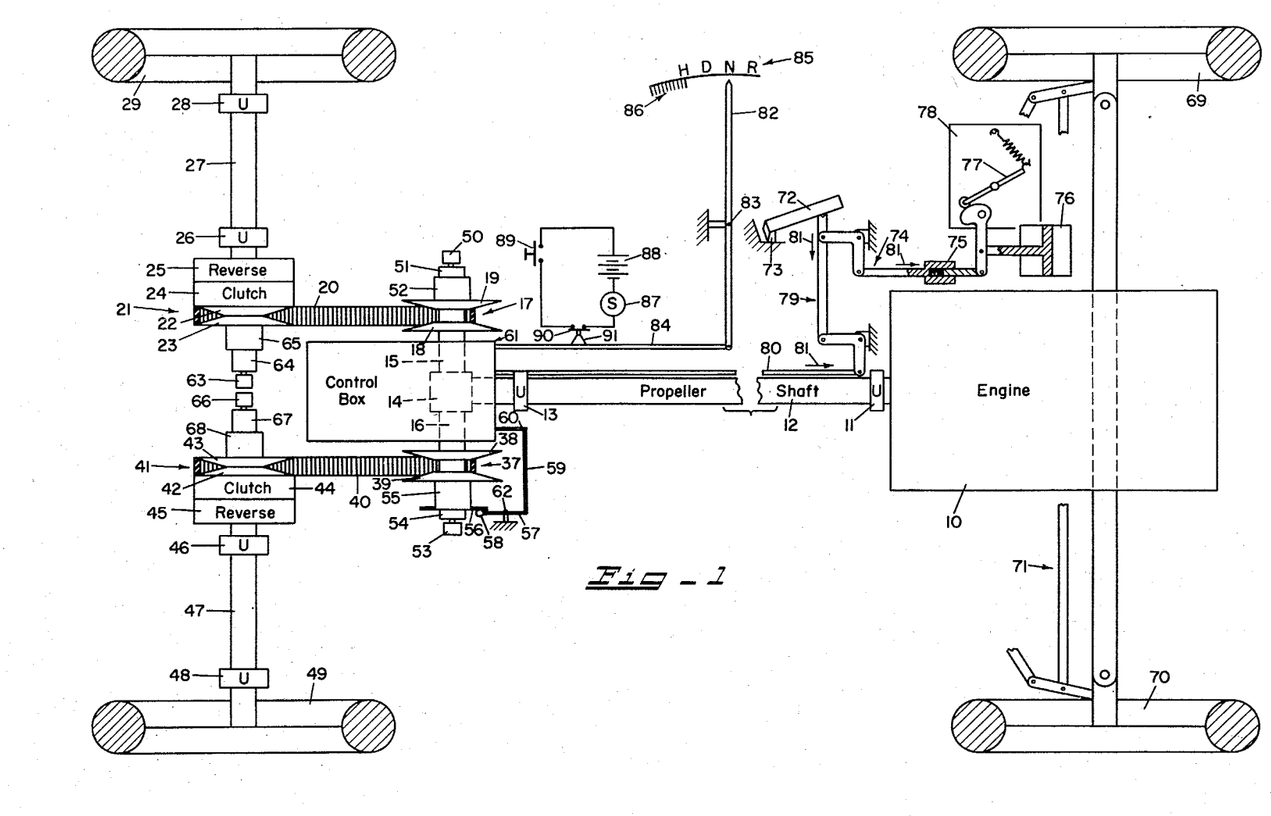
Fig. 1 is a schematic plan view of an automatic transmission used in a vehicle and including the automatic transmission control system of the present invention.

Referring to Fig. 1, the vehicle engine 10 is connected by a universal joint 11, a propeller shaft 12, a universal joint 13, and a gear coupling 14, to provide rotation of driver shafts 15, 16, which may be two different shafts, or preferably two portions of the same shaft.

The shaft 15 drives a driver pulley 17 comprising a fixed flange 18 and a movable flange 19, which is axially slidable with respect to the driver shaft 15, but may be rotatably fixed thereto. A continuous belt 20 provides a driving connection from the driver pulley 17 to a driven pulley 21 comprising a fixed flange 22 and a movable flange 23 which is axially slidable with respect to its shaft, but may be rotatably fixed thereto. The driven pulley 21 is connected through a clutch 24, a gear coupling 25, which can be shifted to reverse direction, a universal joint 26, a shaft 27, and a universal joint 28, to the left rear wheel 29.

The drive shaft 16 drives a driver pulley 37 comprising a fixed flange 38 and a movable flange 39, which is axially slidable with respect to the driver shaft 16, but may be rotatably fixed thereto. A continuous belt 40 provides a driving connection from the driver pulley 37 to a driven pulley 41 comprising a fixed flange 42 and a movable flange 43 which is axially slidable with respect to its shaft, but may be rotatably fixed thereto. The driven pulley 41 is connected through a clutch 44, a gear coupling 45, which can be shifted to reverse direction, a universal joint 46, a shaft 47, and a universal joint 48, to the right rear wheel 49.

The position of the movable flange 19 of the driver pulley 17 is controlled by controlling the fluid pressure applied against the movable flange 19 through a rotary seal 50 and a movable-flange control 51, which may comprise any suitable means for applying fluid pressure against the movable flange 19, such as that illustrated in Fig. 5 or Fig. 12 of U. S. Patent 2,754,691. Connected to the movable flange 19 is a flange backing ring 52.

The position of the movable flange 39 of the driver pulley 37 is controlled by controlling the fluid pressure applied against the movable flange 39 through a rotary seal 53 and a movable-flange control 54, which may be similar to movable flange control 51. Connected to the movable flange 39 is a flange backing ring 55. The flange backing ring 55 has a flat surface 56 perpendicular to the driver shaft 16.

A flange-follower rod 57 has at one end a follower shoe or antifriction wheel 58 which bears against the flat surface 56. The other end of the flange-follower rod 57 is pivotably connected to one end of a linkage rod 59, the other end of which is pivotably connected to another linkage rod 60 associated with a control box 61. An intermediate point on the flange-follower rod 57 is pivotably connected to a fixed point, as is indicated at 62. The control box 61 includes means for positioning the movable flange 19 of the driver pulley 17 and the movable flange 39 of the driver pulley 37 to control the gear ratio between the driver pulleys 17, 37 and the respective driven pulleys 21, 41.

The pressure of the driven pulley 21 against the belt 20 is controlled by controlling the fluid pressure applied against the movable flange 19 through a rotary seal 63 and a movable-flange control 64, which may comprise any suitable means for applying fluid pressure against the movable flange 19. Connected to the movable flange 19 is a flange backing ring 65.

The pressure of the driven pulley 41 against the belt 40 is controlled by controlling the fluid pressure applied against the movable flange 43 through a rotary seal 66 and a movable-flange control 67, which may comprise any suitable means for applying fluid pressure against the movable flange 43. Connected to the movable flange 43 is a flange backing ring 68.

The control box 61 includes means for applying proper fluid pressure through the rotary seals 63, 66 to the movable flange controls 64, 67.

The left front wheel 69 and the right front wheel 70, which may be connected to the vehicle through any suitable mounting and steering linkage, as is indicated generally at 71, are included in Fig. 1 merely for completeness in illustrating the general layout of the vehicle.

An accelerator pedal 72, pivotably mounted at a fixed point 73, is connected by a linkage 74, including a resilient coupling 75 and a dash pot 76 to avoid sudden changes, to any suitable engine throttle, such as the cam-operated throttle 77 of the engine carburetor 78. The accelerator pedal 72 is connected by a linkage 79 to a throttle linkage rod 80 which is operatively connected to the control box 61. When the accelerator pedal is pressed down to increase the rate of fuel supply to the engine, the rod 80 moves forward, away from the control box 61, as the arrows 81—81 indicate.

A shift-selector arm 82 is pivotably connected at an intermediate point to a fixed point 83, and is pivotably connected at one end to one end of a shift-selector linkage rod 84 which is operatively connected to the control box 61. Control-quadrant indicator markings 85 are provided at the indicator end of the shift-selector arm 82. The letter "R" indicates reverse, "N" indicates neutral, "D" indicates the normal driving position, and "H" indicates the hillbrake setting. The "R," "N," and "D" settings are single points which may be located by detents or any other convenient means. The hillbrake setting may be varied over a range as is indicated by the several dial markings at 86.

The engine starter 87 is connected in series with the vehicle battery 88, the operator's starter button 89, and a starter interlock switch 90. A projection 91 on the shift-selector linkage rod 84 closes the interlock switch 90 when the switch-selector arm 82 is set in the neutral position, "N," as in Fig. 1, and the interlock switch 90 remains open when the shift-selector arm 82 is in any other position.

Figure 2:
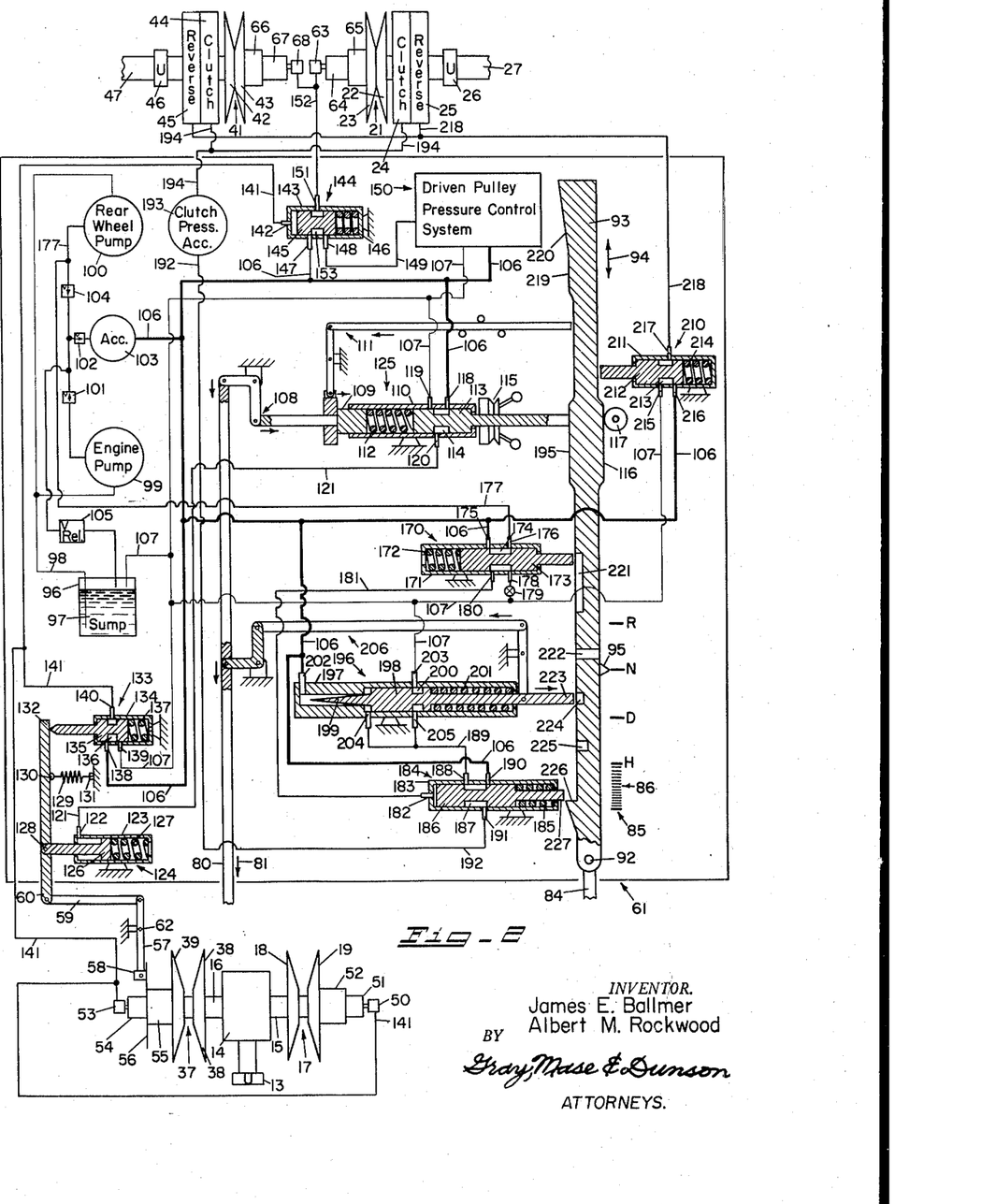
Fig. 2 is a schematic view of a preferred form of the automatic-transmission control system.

Referring to Fig. 2, the shift-selector linkage rod 84 is pivotably connected at its end 92 to one end of a shift bar 93 which is mounted in the control box 61 in such manner as to be slidable in a straight line, as is indicated at 94. The pointer 95 and the shift-indicator markings 85, 86 in Fig. 2 indicate the position of the shift bar 93 for the correspondingly indicated positions of the shift-selector arm 82 of Fig. 1.

The control system may use any suitable fluid, whether liquid or gas. For convenience, the system is described as a hydraulic one using oil. A sump 96 contains sufficient fluid 97, preferably oil, for the operation of the system. A fluid line 98 supplies the fluid 97 to an engine pump 99 and to a rear wheel pump 100. The engine pump 99 is driven by the engine 10 and the rear wheel pump 100 is driven by one of the rear wheels 29, 49. The engine pump 99 provides the fluid 97 under suitable high pressure through a check valve 101 and a check valve 102 to an accumulator 103 which provides pressurized storage of the fluid 97. The rear wheel pump 100 supplies the fluid 97 under suitable high pressure through a check valve 104 and the check valve 102 to the accumulator 103. The check valves 101, 104 isolate the pumps 99, 100 so they can operate independently, and one pump cannot motorize the other. The junction of the check valves 101, 102, 104 is connected to a relief valve 105, which permits drainage of the fluid 97 back into the sump 96. A high-pressure fluid line 106 connected to the accumulator 103 provides the fluid 97 at high pressure to various components of the system. A sump fluid line 107 provides drainage of the fluid 97 at suitable low pressure from various components of the system back to the sump 96.

Figures 3, 5:
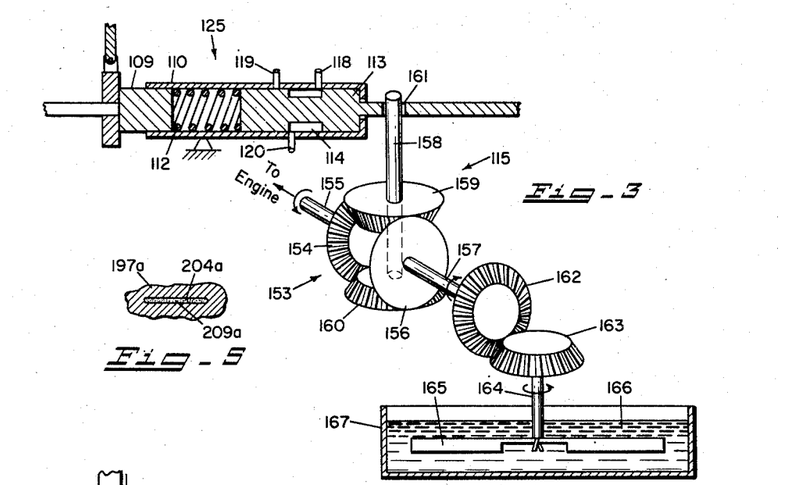
Fig. 3 is a schematic perspective view of a preferred form of governor in the automatic-transmission control system.
Fig. 5 is a sectional view taken on the line 5—5 of Fig. 4.

The accelerator control rod 80 is connected to a linkage 108 to vary the position of a piston 109 which is slidable within a stationary cylindrical casing 110. A linkage 111, controlled by the shift bar 93 also may vary the position of the piston 109. The linkages 108, 111 are not rigidly connected to the piston 109 nor to each other, but are positioned to push the piston 109 to the right against the force of a compression spring 112, and whichever linkage 108 or 111 pushes farthest to the right at a given time determines the position of the piston 109 at that instant. Also slidably mounted in the casing 110 is a cylindrical valve output piston 113 provided with an annular groove 114. A governor 115, indicated schematically in Fig. 2, opposes the force of the spring 112 and tends to force the valve piston 113 toward the left. Details of a preferred form of governor 115 are shown in Fig. 3.

The surface 116 of the shift bar 93 holds the valve piston 113 in its rightmost position, as shown in Fig. 2, by positioning the roller 117 which is connected to the piston 113, when the shift bar 93 is in the neutral and reverse positions, "N" and "R." When the shift bar 93 is in the drive and hillbrake positions, "D" and "H," the piston 113 is free to move to the left. A right-hand opening 118 in the casing 110 is connected to the high-pressure fluid line 106. A left-hand opening 119 in the casing 110 is connected to the sump fluid-return line 107. An intermediate opening 120 in the casing 110 is connected by a fluid line 121 to an opening 122 in a stationary casing 123 of a ratio control cylinder 124. The casing 110 and associated components comprise a ratio pressure-control valve 125. The position of a piston 126 in the ratio control cylinder 124 is determined by the opposing forces of the fluid pressure from the fluid line 121 and the compression force of a spring 127.

The piston 126 is pivotably connected to the point 128 on the linkage rod 60. A spring 129 is connected in tension between a point 130 on the linkage rod 60 and a fixed point 131. The position of the movable flange 39 of the driven pulley 37 determines the position of the roller 58 on the flange-follower rod 57. The position of the piston 126 determines the position of the linkage point 128 on the rod 60. The spring 129 presses the roller 58 against the flat surface 56 of the flange backing ring 55. Thus the position of the end 132 of the linkage rod 60 is determined at any given instant.

A driver pressure control valve 133 comprises a fixed cylindrical casing 134, a slidable piston 135 provided with an annular opening 136, and a compression spring 137 which presses the piston 135 against the end 132 of the linkage rod 60. A left-hand opening 138 in the casing 134 is connected to the high-pressure fluid line 106. A right-hand opening 139 in the casing 134 is connected to the sump fluid line 107. An intermediate opening 140 in the casing 134 is connected by a fluid line 141 to the rotary seals 50, 53 to control the fluid pressure of the movable flanges 19, 39 of the driver pulleys 17, 37.

The fluid line 141 is connected also to an opening 142 in the fixed cylindrical casing 143 of a driven pressure-control valve 144. The fluid pressure in the line 141 provides a force against a slidable piston 145 tending to press it to the right against the compression force of a spring 146. A left-hand opening 147 in the casing 143 is connected to the high-pressure fluid line 106. A right-hand opening 148 in the casing 143 is connected by a fluid line 149 to a driven-pulley pressure-control system 150. An intermediate opening 151 in the casing 143 is connected by a fluid line 152 to the rotary seals 63, 68 to control the fluid pressure against the movable flanges 23, 42 of the driven pulleys 21, 41. The high-pressure fluid line 106 and the sump fluid line 107 are also connected to the driven-pulley pressure-control system 150.

The driven-pulley pressure-control system 150 may comprise any suitable means for providing a suitable fluid pressure against the movable flanges 23, 43 of the driven pulleys 21, 41 for convenient operation and good belt life. Preferably, it should comprise a driven-pulley pressure-control system according to U. S. Patent 2,731,849 of Albert M. Rockwood, James E. Ballmer, and Claude Hector May. When the fluid pressure in the fluid line 141 is sufficient to force the piston 145 to the right, so that the annular opening 153 in the piston 145 registers with the right-hand opening 148 of the casing 143, the fluid pressure determined by the driven-pulley pressure-control system 150 is connected to the fluid line 152. When the pressure in the fluid line 141 is negligible, the spring 146 forces the piston 145 to the left, connecting the high pressure from the fluid line 106 through the left-hand opening 147 in the casing 143, the annular opening 153 in the piston 145, and the opening 151 in the casing 143 to the fluid line 152. This provides a full-low gear ratio between the driver pulleys 17, 37 and the driven pulleys 21, 41.

The ratio pressure-control valve 125, the ratio control cylinder 124, the driver pressure-control valve 133, and associated components of the driver-pulley pressure-control system comprise a gear-ratio control system according to the above-mentioned U. S. Patent 2,731,849. The ratio pressure-control valve 125 is equivalent to the valve 25 of Figs. 2 and 5 of the patent, the ratio control cylinder 124 is equivalent to the cylinder 40 if Figs. 4 and 5, and the driver pressure-control valve 133 is equivalent to the valve 72 of Figs. 4 and 5 of the patent. The linkage 57, 59, 60 and other features of the combination herein avoid any need for movable valve casings and flexible fluid lines.

Fig. 3 illustrates schematically a preferred form of the governor 115 as used with the ratio control valve 125. A differential 153 includes a driver input gear 154 rigidly connected to a shaft 155, which is driven by the engine 10 in any convenient manner as through the gear box 14; a reaction gear 156 rigidly connected to a shaft 157; and a spider shaft 158 rotatably mounted on spider gears 159, 160. The spider shaft 158 is slidably linked as is indicated at 161 to provide a force on the valve piston 113 opposing the force of the compression spring 112. The shaft 157 is rigidly connected to a bevel gear 162 which meshes with another bevel gear 163 rigidly connected to one end of a shaft 164, the other end of which is connected to a fan 165. The fan 165 is submerged in a liquid 166, such as oil, held by a container 167.

The speed of the engine 10 may be varied over a range of approximately 7.5, as from 600 to 4500 R. P. M. Most mechanical speed signal devices generate a force proportional to the square of the speed. For a speed range of 7.5 the force range would be 56.25, which is much too large for use with a sensitive control mechanism as is required in the present gear ratio control system.

The governor 115 of Fig. 3 provides forces approximately proportional to the engine speed, and the force range is, therefore, only about 7.5. The torque required to drive the fan 165, which is approximately a linear function of engine speed, is applied by the spider shaft 158 to the valve piston 113 to balance the compression force of the spring 112. Since the piston 113 can travel only over a small distance, the spider shaft 158 can rotate only through a small angle. The position of the piston 109, as determined by the position of the accelerator pedal 172 through the linkage 79, the rod 80 and the linkage 108, or by the position of the linkage 111, determines the engine speed at which balance is obtained. Since the torque needed to drive the fan 165 increases linearly with speed and the reaction of this torque is applied through the differential 153 to the valve piston 113, there is only one fan speed that creates a force balance for any given position of the piston 109. When the force of the spring 112 and the torque reaction of the fan 165 are not balanced, the valve piston 113 is moved so as to change the gear ratio in the proper direction to obtain a condition of balance. As the gear ratio changes, the engine speed increases or decreases as the case may be until a different fan speed is obtained that provides a balanced condition.

To control the reaction torque of the fan 165 as a function of speed, the fan 165 may be constructed so as to permit the fan blades to be deflected by the pumping action. The amount of deflection is an additional design variable, along with the shape and size and initial angle of the fan blades, useful in designing the fan 165 to obtain optimum torque characteristics for specific requirements.

A valve 170 includes a fixed cylindrical casing 171 having therein a compression spring 172 and a piston 173 provided with an annular groove 174. A left-hand inlet opening 175 in the casing 171 is connected to the high pressure fluid line 106. A right-hand inlet opening 176 in the casing 171 is connected by a fluid line 177 to the rear wheel pump 100. A right-hand outlet opening 178 in the casing 171 is connected through an orifice 179 to the sump fluid line 107. The orifice 179 causes a pressure between the rear wheel pump 100 and the orifice 179 that increases with increasing driving speed of the rear wheel pump 100. This fluid pressure is applied through a left-hand outlet opening 180 in the casing 171 to a fluid line 181 which is connected to an opening 182 in the fixed cylindrical casing 183 of a clutch control valve 184.

In the casing 183 are a compression spring 185 and a piston 186 having an annular groove 187. A left-hand opening 188 in the casing 183 is connected to a fluid line 189. A right-hand opening 190 in the casing 183 is connected to the high pressure fluid line 106. An intermediate opening 191 in the casing 183 is connected by a fluid line 192 to a clutch pressure accumulator 193 which provides pressurized storage of the fluid received. The clutch pressure accumulator 193 supplies pressurized fluid through a fluid line 194 to the clutches 24, 44, which are engaged by fluid pressure and remain disengaged in the absence of fluid pressure.

When the shift selector 82 is set at any of the hill-brake "H" positions 86, the surface 195 of the shift bar 93 presses the piston 173 to the left in the valve 170, blocking the opening 176 in the casing 171 and the fluid line 177 thereby permitting the rear wheel pump 100 to build up a high pressure when the vehicle is in motion. The rear wheel pump 100 provides the fluid 97 at high pressure through the check valves 104, 102 to the accumulator 103 and the high pressure fluid line 106. The high pressure fluid 97 is provided through the fluid line 106, the opening 175 in the casing 171 of the valve 170, the annular groove 174, the opening 180, and the fluid line 181 to the opening 182 in the casing 183 of a valve 184. The high pressure fluid 97 pushes the piston 186 to the right in the valve 184, connecting the high pressure fluid line 106 through the opening 190 in the casing 183, the annular groove 187, the opening 191, and the fluid line 192 to the clutch pressure accumulator 193, providing fluid pressure in the fluid line 194 to engage the clutches 24, 44. Thus, the engine 10 can be started by pushing the vehicle. Without the pressure developed by the rear wheel pump 100, the clutches 24, 44 could not be engaged to start the engine 10, since the engine pump 99 does not operate except when the crank shaft of the engine 10 is turning.

A variable opening valve 196 includes a fixed cylindrical casing 197 containing a piston 198, having a needle end 199 and an annular groove 200, and a compression spring 201. An input opening 202 in the casing 197 is connected to the high pressure fluid line 106. A drain opening 203 in the casing 197 is connected to the sump fluid line 107. Output openings 204, 205 in the casing 197 are connected to the fluid line 189, which is connected to the opening 188 in the casing 183 of the valve 184. A linkage 206 is connected from the piston 198 to the accelerator linkage rod 80 so that pressing down on the accelerator pedal 72 moves the piston 198 to the right. As the piston 198 moves further to the right, the needle end 199 provides a larger opening for the flow of fluid from the high pressure line 106 through the opening 202, to the opening 204 and the fluid line 189.

The fluid in the line 189 is transmitted through the opening 188 in the casing 183 of the valve 184, the annular groove 187, the opening 191, the fluid line 192 and the clutch pressure accumulator 193, to the fluid line 194, which applies the fluid pressure to the clutches 24, 44. Thus the valve 196 provides fluid to the clutches 24, 44 at a rate depending upon the distance the piston 198 is moved by the accelerator pedal 72 and the connecting linkages. A gradual clutch engagement is provided for a small throttle opening and a fast clutch engagement is provided for a large throttle opening.

Figure 4:
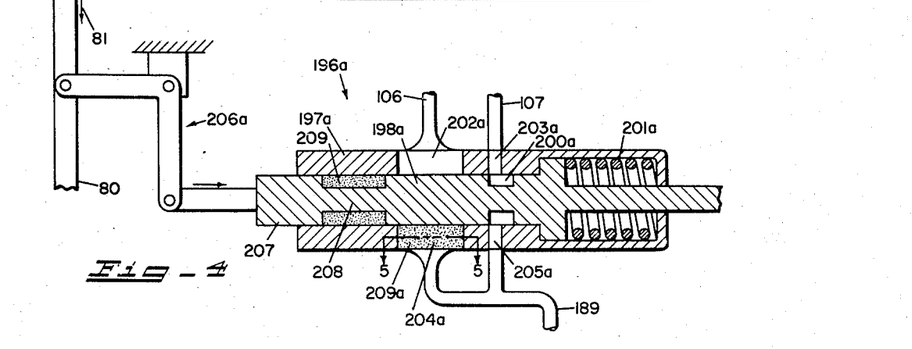
Fig. 4 is a sectional view of a preferred form of proportional opening valve for use in the system.

Fig. 4 shows another form of proportional opening valve 196a. All of the details 197a—206a are similar to the details of the valve 196 that are correspondingly numbered without the subscripts, except the linkage 206a which is shown for convenience as connected to the left end of the piston 198a rather than to the right end, and the output opening 204a which is a narrow slit as is shown in Fig. 5. The input opening 202a may also be a narrow slit, if desired, or may have any other convenient shape. If the input opening 202a is a narrow slit as in Fig. 5, the output opening may have any convenient shape. Instead of having a needle end, the piston 198a is provided with a cylindrical left end portion 207 connected by a neck 208 to the main body of the piston 198a. The annular space between the neck 208 and the casing 197a is filled with a rigid porous material 209 such as porous bronze or other porous metal. The valve 196a provides a variable orifice comprising the porous material 209 which is moved across the narrow slit opening 204a, to vary the cross section of the path through which the fluid flows. The combination of the porous material 209 with the slit opening 204a minimizes any possibility of clogging (a problem in small orifices); and provides increased sensitivity, since a relatively large movement of the piston 198a provides a relatively small effective orifice change in the fluid path. If desired, either or both of the openings 202a, 204a may also be filled with a rigid porous material. If the narrow slit opening is filled with porous material, as is indicated at 209a, the porous material in the annular space around the neck 208 may be omitted if desired.

A reversing valve 210 comprises a fixed cylindrical casing 211 containing a piston 212 having an annular groove 213, and a compression spring 214. A left-hand opening 215 in the casing 211 is connected to the sump fluid line 107. A right-hand opening 216 in the casing 211 is connected to the high pressure line 106. An intermediate opening 217 in the casing 211 is connected to a fluid line 218 which is connected to the reversing gears 25, 45. The reversing gears 25, 45 may be any conventional reversing gears which can be shifted from forward to reverse drive. Normally, in the absence of fluid pressure in the fluid line 218, the reversing gears 25, 45 are in the forward-drive position. When the shift bar 93 is in any position except the reverse "R" position the piston 212 of the reversing valve 210 is in its left position as shown in Fig. 2; the fluid line 218 is connected through the opening 217, the annular groove 213, and the opening 215 to the sump line 107, and the reversing gears 25, 45 remain in their forward-drive position. When the shift bar 93 is in the reverse "R" position, the surface 116 on the shift bar 93 pushes the piston 212 to the right connecting the high pressure line 106 through the opening 216, the annular groove 213, and the opening 217 to the fluid line 218, applying fluid pressure to the reversing gears 25, 45 and shifting them to their reverse position.

The cylinder 124 and the valve 133 cause the transmission drive ratio to be increased or decreased, depending on whether the valve 125 connects the fluid line 121 to the high-pressure fluid line 106 or the sump fluid line 107. The piston 113 which controls this is acted upon by the opposing forces of the compression spring 112 and of the engine-driven governor 115 which provides a force proportionate to actual engine speed. The force of the spring 112 is determined by the position of the piston 109, which is controlled by the operator of the vehicle. Thus, the transmission ratio is controlled to cause the engine 10 to run at the speed desired by the operator regardless of road load or vehicle speed.

When the shift bar 93 is in the reverse "R" and neutral "N" positions, the piston 109 is in its leftmost position as shown in Fig. 2 when the accelerator pedal is not depressed. When the shift bar 93 is in the normal drive "D" position, the surface 219 presses against the linkage 111 causing the piston 109 to move to the right of the position shown in Fig. 2. When the shift bar 93 is in any of the hillbrake "H" positions 86, the surface 220 pushes the linkage 111 further, moving the piston 109 further to the right, so that the operator can select the desired engine speed by means of the shift-selector rod 82 when using the engine 10 to brake the vehicle, as when going down a hill. Within the speed limits of the engine 10, the operator can control the amount of engine braking to be applied at any time.

The slot 221 in the shift bar 93 limits the movement of the piston 198 of the valve 196, and thus limits the movement of the linkage 206 and of the accelerator linkage rod 80, when the shift bar 93 is in any of the hillbrake "H" positions 86, and prevents movement of the shift bar 93 to any other position when the end 223 of the piston 198 protrudes into the slot 221. When the shift bar 93 is in the drive "D" position, the slot 222 in the shift bar 93 permits the piston 198 and associated linkages to move throughout their full available range of movement, and prevents movement of the shift bar 93 when the end 223 of the piston 198 protrudes into the slot 222. When the shift bar 93 is in the neutral "N" position, the slot 224 in the shift bar 93 limits the movement of the piston 198 and associated linkages to prevent engagement of the clutches 24, 44, and prevents movement of the shift bar 93 when the end 223 of the piston 198 protrudes into the slot 224. The slot 225 in the shift bar 93 limits the movement of the piston 198 and associated linkages when the shift bar 93 is in the reverse "R" position to avoid excessive speed when the vehicle is travelling in the reverse direction, and prevents movement of the shift bar 93 when the end 223 of the piston 198 protrudes into the slot 225. The shoulder 226 on the shift bar 93 prevents movement of the shift bar 93 into the reverse "R" position when the end 227 of the piston 186 of the valve 184 protrudes beyond the left end of the shoulder 226. At high speeds, with the shift bar 93 in the drive "D" position, the end 227 of the piston 186 may protrude into the slot 225, preventing shifting of the shift bar 93. The valve 184 also maintains the clutches 24, 44 in engagement when the vehicle is travelling at a predetermined wheel speed, or faster.

To summarize, the present invention includes the following features:

A. In a vehicle having, a driving means 10 provided with a power control 72, a variable gear ratio transmission comprising a driver pulley 17, 37 connected to said driving means 10 and having a fixed flange 18, 38 and a movable flange 19, 39 a driven pulley 21, 41 having a fixed flange 22, 42 and a movable flange 23, 43, and a belt 20, 40 between said driver pulley 17, 37 and said driven pulley 21, 41, and a clutch 24, 44, and a drive wheel 29, 49 connected by said clutch 24, 44 to said driven pulley 21, 41; means for operating said driving means 10, transmission, and clutch 24, 44 comprising, in combination: means 115, 125, 124, 133 responsive to the setting of said power control 72 and the speed of said driving means 10, including means 115 connected to said driving means 10 and responsive to the speed thereof, for controlling the gear ratio between said driver pulley 17, 37 and said driven pulley 21, 41; means 196 responsive to the setting of said power control 72 for controlling said clutch 24, 44; and means 82, 84, 93 for selectively controlling the response characteristics of said gear ratio control means and said clutch control means.

B. The combination A, in which said gear ratio control means controls the pressure in means 51, 54 applying fluid pressure against said movable flange 19, 39 of said driver pulley 17, 37.

C. The combination B, including a fluid sump 96, a first pump 99 connected to said sump 96 and driven by said driving means 10, a second pump 100 connected to said sump 96 and driven by said drive wheel 29, 49, a fluid accumulator 103 connected to said first pump 99 and to said second pump 100 for providing pressurized storage of fluid 97 pumped thereto by said pumps 99, 100, and means for connecting said accumulator 103 to fluid pressure actuators for said transmission and clutch 24, 44.

D. The combination B, including means 144, 150 for controlling the pressure in means 64, 67 applying fluid pressure against said movable flange 23, 43 of said driven pulley 21, 41 to provide suitable pressure on said belt 20, 40.

E. The combination D, in which said last-mentioned pressure-controlling means 144, 150 includes means 144 for providing high fluid pressure to said last-mentioned pressure-applying means 64, 67 when the pressure against said movable flange 19, 39 of said driver pulley 17, 37 is less than a predetermined pressure.

F. The combination A, in which said gear ratio control means includes means 109, 112 for applying an adjustable force on a movable member 113, and in which said response characteristic control means includes means 220, 111 for selectively modifying the adjustment of said force-applying means 109, 112.

G. The combination A, in which said response characteristic control means includes selective means 195, 170, 184 for engaging said clutch 24, 44 when said drive wheel 29, 49 rotates faster than a predetermined speed.

H. The combination A, in which said clutch control means includes means for applying fluid pressure to engage said clutch 24, 44, and in which said response characteristic control means includes selective means 195, 170, 184 for providing said fluid pressure by rotation of said drive wheel 29, 49.

I. The combination A, in which said transmission includes reversible gearing 25, 45, and in which said response characteristic control means includes means 93 for selectively, at one setting "R" thereof: shifting 116, 210 said reversible gearing to drive said vehicle in the reverse direction; providing 116, 117 a predetermined gear ratio between said driver pulley 17, 37 and said driven pulley 21, 41; limiting 225 the range of settings of said power control 72; preventing 223, 225 movement of said selective means 93 away from said setting "R" when the setting of said power control 72 is within a predetermined range; and disengaging 226, 184 said clutch 24, 44 when said selective means 93 is moved away from said setting "R."

J. The combination A, in which said response characteristic control means includes means 93 for selectively, at one setting "N" thereof: providing 116, 117 a predetermined gear ratio between said driver pulley 17, 37 and said driven pulley 21, 41; limiting 224 the range of settings of said power control 72 and preventing 224, 196 engagement of said clutch 24, 44; preventing 223, 224 movement of said selective means 93 away from said setting "N" when the setting of said power control 72 is within a predetermined range; and limiting 226, 227 movement of said selective means 93 when the speed of said vehicle is greater than a predetermined speed.

K. The combination J including means 87—90 for starting said driving means 10, and means 91 for selectively controlling said starting means 87—90 to permit operation thereof only when said selective means 93 is set at said setting "N."

L. The combination A, in which said response characteristic control means includes means 93 for selectively, at one setting "D" thereof: limiting 219, 111 the range of settings of a response adjusting member 109 in said gear ratio control means; permitting 222 said power control 72 to move throughout its full available range of movement; and preventing 222, 223 movement of said selective means 93 away from said setting "D" when the setting of said power control 72 is within a predetermined range, and 225, 226 when the speed of said vehicle is greater than a predetermined speed.

M. The combination A, in which said response characteristic control means includes means 93 for selectively, within a range 86 of settings "H" thereof: variably limiting 220, 111 the range of settings of a response adjusting member 109 in said gear ratio control means; engaging 195, 170, 184 said clutch 24, 44 when the speed of said vehicle is greater than a predetermined speed; limiting 221 the range of settings of said power control 72; and preventing 221, 223 movement of said selective means 93 away from said range 86 of settings "H" when the setting of said power control 72 is within a predetermined range.

N. A governor 115 comprising: a differential 153 having a driver input gear 154 driven by driving means 10, a reaction gear 156 coaxial with said driver input gear 154, and a spider shaft 158 rotatably mounted on a pair of spider gears 159, 160 meshing with said driver input gear 154 and said reaction gear 156; said spider shaft 158 being positioned to apply a force on a movable member 113; and a fan 165 connected to, and driven by, said reaction gear 156 and surrounded by a liquid 166.

O. A variable opening valve 196a comprising: a fixed casing 197a; a piston 198a, slidable in said casing 197a, having an end portion 207 slidably fitting in said casing 197a, a neck 208 spaced from the inner wall of said casing 197a and connecting said end portion 207 to a main body portion 198a slidably fitting in said casing 197a; a first opening 202a in said casing 197a; a second opening 204a in said casing 197a; at least one said opening 202a, 204a being substantially longer in a direction parallel to the direction in which said piston 198a is slidable than in a direction perpendicular thereto; means 206a, 201a for positioning said piston 198a in said casing 197a including means 206a for varying the position of said piston 198a over a range in which the proportion of the longer dimension of said at least one opening 202a, 204a registering with the space between said neck 208 and said casing 197a can be varied; means 106 for applying fluid under pressure to one said opening 202a through said space to the other said opening 204a when at least a portion of said space registers with at least a portion of said openings 202a, 204a; and a porous material 209, 209a, adjacent the area of registry of said space with said at least one opening 202a, 204a.

The reference characters in the above summary indicate generally the primary components shown in the drawings corresponding to the recited features, to facilitate understanding of the claims. The reference characters are used merely by way of example, however, and not in any limiting sense.

While the form of the invention herein disclosed constitutes a preferred embodiment, it is not intended to describe all of the possible equivalent forms or ramifications of the invention. It will be understood that the words used are words of description rather than of limitation, and that various changes, as in shape, relative size, and arrangement of parts, may be made without departing from the spirit or scope of the invention herein disclosed.

What is claimed is:

1. A governor comprising a differential having a driver input gear driven by driving means, a reaction gear coaxial with said driver input gear, and a spider shaft rotatably mounted on a pair of spider gears meshing with said driver input gear and said reaction gear, said spider shaft being positioned to apply a force on a movable member, and a fan connected to, and driven by, said reaction gear, and surrounded by a liquid.

2. A variable opening valve comprising: a fixed casing; a piston, slidable in said casing, having an end portion slidably fitting in said casing, a neck spaced from the inner wall of said casing and connecting said end portion to a main body portion slidably fitting in said casing; a first opening in said casing; a second opening in said casing; at least one said opening being substantially longer in a direction parallel to the direction in which said piston is slidable than in a direction perpendicular thereto; means for positioning said piston in said casing including means for varying the position of said piston over a range in which the proportion of the longer dimension of said at least one opening registering with the space between said neck and said casing can be varied; and means for applying fluid under pressure to one said opening through said space to the other said opening when at least a portion of said space registers with at least a portion of said openings; and a porous material adjacent the area of registry of said space with said at least one opening.

3. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley by controlling the pressure in means applying fluid pressure against said movable flange of said driver pulley; means responsive to the setting of said power control for controlling said clutch; and means for selectively controlling the response characteristics of said gear ratio control means and said clutch control means; including a fluid sump, a first pump connected to said sump and driven by said driving means, a second pump connected to said sump and driven by said drive wheel, a fluid accumulator connected to said first pump and to said second pump for providing pressurized storage of fluid pumped thereto by said pumps, and means for connecting said accumulator to fluid pressure actuators for said transmission and clutch.

4. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley by controlling the pressure in means applying fluid pressure against said movable flange of said driver pulley; means responsive to the setting of said power control for controlling said clutch; and means for selectively controlling the response characteristics of said gear ratio control means and said clutch control means; including means for controlling the pressure in means applying fluid pressure against said movable flange of said driven pulley, to provide suitable pressure on said belt; said last-mentioned pressure-controlling means including means for providing high fluid pressure to said last-mentioned pressure-applying means when the pressure against said movable flange of said driver pulley is less than a predetermined pressure.

5. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; said gear ratio control means including means for applying an adjustable force on a movable member, and said response characteristic control means including means for selectively modifying the adjustment of said force-applying means.

6. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; said response characteristic control means including selective means for engaging said clutch when said drive wheel rotates faster than a predetermined speed.

7. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; said clutch control means including means for applying fluid pressure to engage said clutch, and said response characteristic control means including selective means for providing said fluid pressure by rotation of said drive wheel.

8. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; in which said transmission includes reversible gearing, and in which said response characteristic control means includes means for selectively, at one setting thereof: shifting said reversible gearing to drive said vehicle in the reverse direction; providing a predetermined gear ratio between said driver pulley and said driven pulley; limiting the range of settings of said power control; preventing movement of said selective means away from said setting when the setting of said power control is within a predetermined range; and disengaging said clutch when said selective means is moved away from said setting.

9. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; in which said response characteristic control means includes means for selectively, at one setting thereof: providing a predetermined gear ratio between said driver pulley and said driven pulley; limiting the range of settings of said power control and preventing engagement of said clutch; preventing movement of said selective means away from said setting when the setting of said power control is within a predetermined range; and limiting movement of said selective means when the speed of said vehicle is greater than a predetermined speed.

10. The combination of claim 9, including means for starting said driving means, and means for selectively controlling said starting means to permit operation thereof only when said selective means is set at said setting.

11. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; in which said response characteristic control means includes means for selectively, at one setting thereof: limiting the range of settings of a response adjusting member in said gear ratio control means; permitting said power control to move throughout its full available range of movement; and preventing movement of said selective means away from said setting when the setting of said power control is within a predetermined range, and when the speed of said vehicle is greater than a predetermined speed.

12. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination; means, responsive to the setting of said power control and the speed of said driving means, including means connected to said driving means and responsive to the speed thereof, for controlling the gear ratio between said driver pulley and said driven pulley means responsive to the setting of said power control for controlling said clutch; and means for selectively controlling the response characteristics of said gear ratio control means and said clutch control means; in which said response characteristic control means includes means for selectively, within a range of settings thereof: variably limiting the range of settings of a response adjusting member in said gear ratio control means; engaging said clutch when the speed of said vehicle is greater than a predetermined speed; limiting the range of settings of said power control; and preventing movement of said selective means away from said range of settings when the setting of said power control is within a predetermined range.

13. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; in which said means connected to said driving means and responsive to the speed thereof is a governor comprising a differential having a driver input gear driven by said driving means, a reaction gear coaxial with said driver input gear, and a spider shaft rotatably mounted on a pair of spider gears meshing with said driver input gear and said reaction gear, said spider shaft being positioned to apply a force on a movable member, and a fan connected to, and driven by, said reaction gear, and surrounded by a liquid.

14. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; in which said means for controlling said clutch includes a variable opening valve comprising: a fixed casing; a piston, slidable in said casing, having an end portion slidably fitting in said casing, a neck spaced from the inner wall of said casing and connecting said end portion to a main body portion slidably fitting in said casing; a first opening in said casing; a second opening in said casing; at least one said opening being substantially longer in a direction parallel to the direction in which said piston is slidable than in a direction perpendicular thereto; means for positioning said piston in said casing including means for varying the position of said piston over a range in which the proportion of the longer dimension of said at least one opening registering with the space between said neck and said casing can be varied; means for applying fluid under pressure to one said opening through said space to the other said opening when at least a portion of said space registers with at least a portion of said openings; and a porous material adjacent the area of registry of said space with said at least one opening.

15. In a vehicle having, a driving means provided with a power control, a variable gear ratio transmission comprising a driver pulley connected to said driving means and having a fixed flange and a movable flange, a driven pulley having a fixed flange and a movable flange, and a belt between said driver pulley and said driven pulley, and a clutch, and a drive wheel connected by said clutch to said driven pulley; means for operating said driving means, transmission, and clutch comprising, in combination: means, responsive to the setting of said power control and the speed of said driving means, including means connected to said driving means and responsive to the speed thereof, for controlling the gear ratio between said driver pulley and said driven pulley; means responsive to the setting of said power control for controlling said clutch; and means for selectively controlling the response characteristics of said gear ratio control means and said clutch control means; in which said transmission includes reversible gearing, and in which said response characteristic control means includes means for selectively, at a first setting thereof: shifting said reversible gearing to drive said vehicle in the reverse direction; providing a predetermined gear ratio between said driver pulley and said driven pulley; limiting the range of settings of said power control; preventing movement of said selective means away from said first setting when the setting of said power control is within a predetermined range; and disengaging said clutch when said selective means is moved away from said first setting; at a second setting thereof: providing a predetermined gear ratio between said driver pulley and said driven pulley; limiting the range of settings of said power control and preventing engagement of said clutch; preventing movement of said selective means away from said second setting when the setting of said power control is within a predetermined range; and limiting movement of said selective means when the speed of said vehicle is greater than a predetermined speed; at a third setting thereof: limiting the range of settings of a response adjusting member in said gear ratio control means; permitting said power control to move throughout its full available range of movement; and preventing movement of said selective means away from said third setting when the setting of said power control is within a predetermined range, and when the speed of said vehicle is greater than a predetermined speed; and within a range of fourth settings thereof: variably limiting the range of settings of a response adjusting member in said gear ratio control means; engaging said clutch when the speed of said vehicle is greater than a predetermined speed; limiting the range of settings of said power control; and preventing movement of said selective means away from said range of fourth settings when the setting of said power control is within a predetermined range.

References Cited in the file of this patent
UNITED STATES PATENTS 2,754,691    May ------------------ July 17, 1956